(12) United States Patent
Schrade et al.

(10) Patent No.: US 9,333,942 B2
(45) Date of Patent: May 10, 2016

(54) BELT ROLLER

(71) Applicant: Takata AG, Aschaffenburg (DE)

(72) Inventors: Wolfgang Schrade, Blaustein (DE); Armin Toth, Dornstadt (DE)

(73) Assignee: TAKATA AG, Aschaffenburg (DE)

(*) Notice: Subject to any disclaimer, the term of this patent is extended or adjusted under 35 U.S.C. 154(b) by 0 days.

(21) Appl. No.: 14/269,618

(22) Filed: May 5, 2014

(65) Prior Publication Data

US 2014/0339351 A1 Nov. 20, 2014

(30) Foreign Application Priority Data

May 15, 2013 (DE) .......................... 10 2013 208 947

(51) Int. Cl.
| | |
|---|---|
| *B60R 22/38* | (2006.01) |
| *B60R 22/46* | (2006.01) |
| *B60R 22/34* | (2006.01) |
| *B60R 22/28* | (2006.01) |

(52) U.S. Cl.
CPC .............. *B60R 22/38* (2013.01); *B60R 22/3413* (2013.01); *B60R 22/4676* (2013.01); *B60R 2022/283* (2013.01); *B60R 2022/468* (2013.01)

(58) Field of Classification Search
CPC ............ B60R 22/3413; B60R 22/4676; B60R 2022/283

USPC ....................................................... 242/379.1
See application file for complete search history.

(56) References Cited

U.S. PATENT DOCUMENTS

| | | | | |
|---|---|---|---|---|
| 5,842,658 | A * | 12/1998 | Sayles et al. ................ | 242/379.1 |
| 6,416,008 | B1 | 7/2002 | Fujii et al. | |
| 2002/0084646 | A1 * | 7/2002 | Klingauf et al. .............. | 280/806 |
| 2006/0163410 | A1 | 7/2006 | Blum et al. | |
| 2007/0001047 | A1 * | 1/2007 | Yasuda et al. .............. | 242/379.1 |
| 2007/0120002 | A1 | 5/2007 | Hori | |
| 2008/0087754 | A1 * | 4/2008 | Aihara et al. ................. | 242/374 |
| 2010/0301152 | A1 | 12/2010 | Fleischmann et al. | |

FOREIGN PATENT DOCUMENTS

| | | |
|---|---|---|
| DE | 10200040 15 825 A1 | 10/2005 |
| DE | 1020050 25 174 A1 | 1/2006 |
| DE | 10 2009 032 101 A | 4/2010 |

* cited by examiner

Primary Examiner — Sang Kim
(74) *Attorney, Agent, or Firm* — Gordon & Rees LLP

(57) ABSTRACT

A belt roller for a safety belt having a belt coil for winding and unwinding the safety belt. The roller includes a lockable locking base which is connected to the belt coil and which is suitable for blocking the belt coil in the event of an abrupt rotation of the belt coil in the belt unwinding direction. The roller also includes a force transmission element which couples the belt coil and the locking base in a locking position and is inactive in an unlocking position. The force transmission element has a base member and a shearing portion which can be sheared off.

9 Claims, 6 Drawing Sheets

BELT ROLLER

BACKGROUND

The application relates to a belt roller for a safety belt.

A belt roller is known from the German Offenlegungsschrift DE 10 2009 032 101 A1. This previously known belt roller has a belt coil for winding and unwinding a safety belt, a lockable locking base which is connected to the belt coil and which is suitable for blocking the belt coil in the event of a rotation of the belt coil in the belt unwinding direction, and a force transmission element. The force transmission element couples the belt coil and the locking base in a locking position and is inactive in an unlocking position. Switching the force transmission element into an inactive state or moving the force transmission element from the locking position into the unlocking position is carried out with the previously known belt roller by means of a semi-annular inertia element which has two recesses of different depths and which allows the force transmission element to protrude to a greater or lesser extent from the belt coil depending on its position and consequently permits or prevents engagement in a recess of the locking base. The switching or the rotation of the semi-annular inertia element is carried out in a manner dependent on inertia as soon as a tightening drive of the belt roller is activated and a relative rotation of the belt coil relative to the inertia element is brought about.

There are further known from the prior art belt rollers in which shearable shearing pins connect the belt coil and the locking base to each other. If the force acting on the shearing pin exceeds a predetermined force threshold, the shearing pin is sheared off.

SUMMARY

An object of the invention is to provide a belt roller which can be produced using the smallest possible number of components.

Accordingly, there is provision according to the invention for the force transmission element to have a base member and a shearing portion which can be sheared off, the base member being retained in an axially displaceable manner in a recess of one of the two portions, that is to say, the belt coil or the locking base—referred to below as the first portion—and being able to be axially displaced from a first position, in which the base member protrudes from the recess and engages in the other of the two portions—referred to below as the second portion—into a second position, in which the base member is introduced more deeply into the recess and is separated from the second portion, and the shearing portion in the first position of the base member blocking an axial displacement of the base member from the first position into the second position and allowing the base member to be introduced more deeply into the recess only after a shearing action.

A significant advantage of the belt roller according to the invention can be seen in that a deactivation of the force transmission element may be dependent on the rotation direction or may be carried out depending on the rotation direction of the belt coil with different levels of force: for example, in the belt winding direction, a smaller deactivation force may be provided than in the belt unwinding direction. It is thus, for example, possible to provide for deactivation of the force transmission element by shearing off the shearing portion as soon as a tightening drive of the belt roller becomes active and wishes to turn the belt coil in the belt winding direction. In contrast, in the belt unwinding direction, the stability of the force transmission element may be significantly higher so that, even in the event of a forward displacement of the vehicle occupant and a correspondingly high belt extraction force, the force transmission element can remain active.

Another significant advantage of the belt roller according to the invention can be seen in that—before the shearing portion is sheared off—the force transmission element in the belt unwinding direction can prevent damage to other components, for example, a torsion rod of the belt roller.

An additional significant advantage of the belt roller according to the invention is that, by shearing off the shearing portion when the tightening drive is operated, the force transmission element can be rendered inactive before it can impair the function of a force limitation device which acts after the tightening action—such as, for example, a torsion rod; an excess of force by the force transmission element is consequently excluded during the phase of the belt force limitation occurring after the tightening operation is complete.

With regard to the construction of the shearing portion, it is considered to be advantageous for it to have a stop face against which the second portion presses radially when the belt coil is rotated in the belt winding direction and by means of which the shearing portion is sheared off by the second portion when the belt coil is rotated in the belt winding direction when the belt winding force acting on the stop face exceeds a predetermined force threshold.

As already mentioned, a force transmission element having a base member and shearing portion which can be sheared off is particularly advantageous when the belt roller is provided with a tightening drive; accordingly, it is considered to be advantageous for the belt roller to have a tightening drive and for the stability of the shearing portion to be selected in such a manner that, when the tightening drive is operated, the shearing portion is sheared off and the base member can be moved from the first position into the second position.

With a view to a movement of the base member after the shearing portion has been sheared off, it is considered to be advantageous for the belt roller to have a spring whose resilient force seeks to move the base member in the direction of the second position. The spring may, for example, be a pressure spring or a tension spring.

With regard to the cooperation of the force transmission element with the second portion, it is considered to be advantageous for the second portion to have a recess having a first receiving portion and a second receiving portion and, in the first position of the base member, for a portion of the base member to engage in the first receiving portion of the second portion and for the shearing portion to engage in the second receiving portion of the second portion.

It is advantageous for the first receiving portion of the second portion to be larger than the portion of the base member located therein and for the base member to have play in the first receiving portion. A degree of play makes it more simple for the base member to be separated from the second portion after the shearing portion has been sheared off in order to prevent the force path between the belt coil and locking base.

In order to also achieve a force limitation in the belt unwinding direction, it is considered to be advantageous for the base member itself to be able to be sheared off when a predetermined force is reached or exceeded in the belt unwinding direction.

It is considered to be advantageous in the latter case for the base member to be mechanically more stable than the shearing portion and the shearing force which is required to shear the base member off to be greater than the shearing force required to shear off the shearing portion.

The shearing portion preferably has a support face which is positioned in an axial direction at the outer side on the first portion and which, before the shearing portion is sheared off, blocks a displacement of the base member from the first position into the second position.

The support face and the stop face are preferably located perpendicularly one on the other.

The invention is explained in greater detail below with reference to embodiments. By way of example, in the drawings:

DETAILED DESCRIPTION

Figure 1:
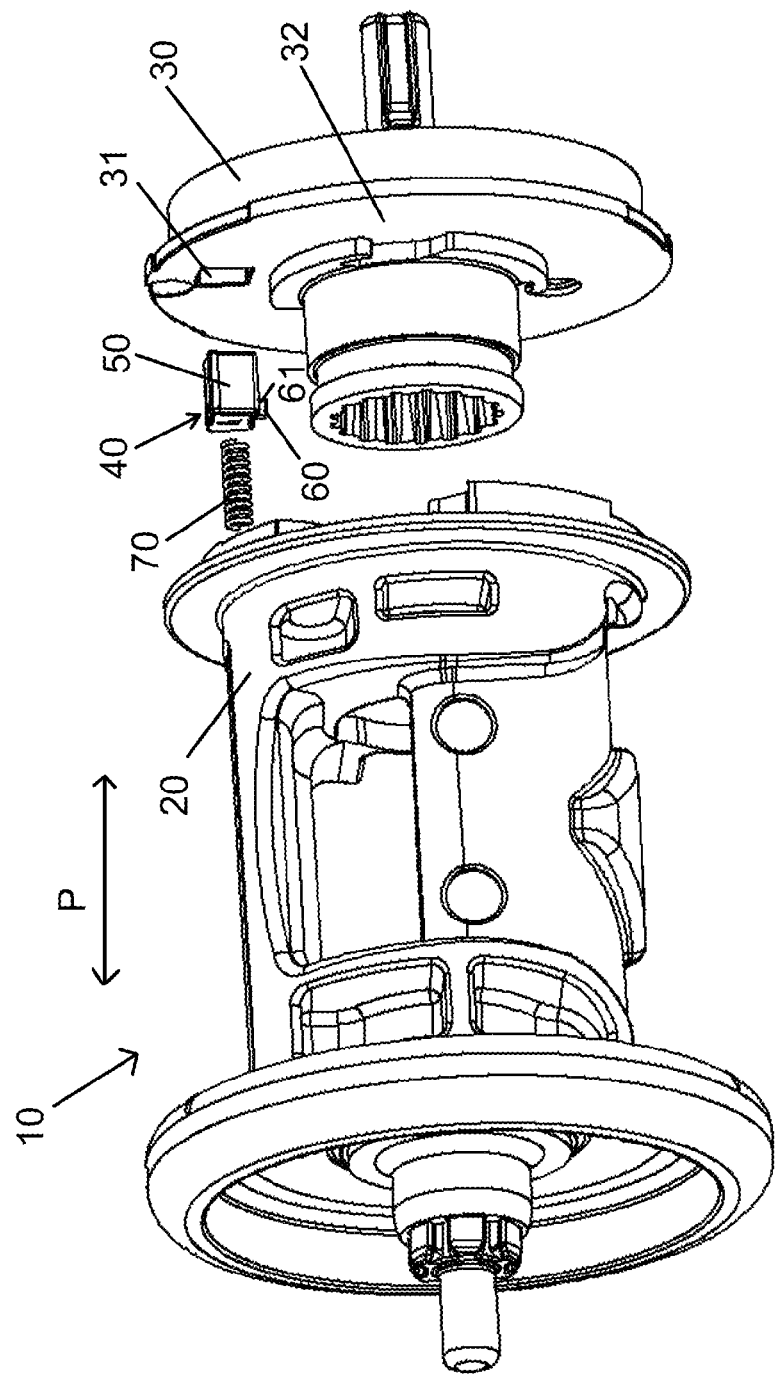
FIG. 1 is a three-dimensional exploded oblique side view of components of a belt roller according to the invention.

In the Figures, for the sake of clarity, the same reference numerals are always used for components which are identical or comparable.

FIG. 1 is a three-dimensional exploded oblique side view of components of a belt roller 10. FIG. 1 shows a belt coil 20 which is suitable for winding and unwinding a safety belt which is not shown. A locking base 30 which is suitable for blocking the belt coil 20 in the event of an abrupt rotation of the belt coil 20 in the belt unwinding direction cooperates with the belt coil 20. To this end, the locking base 30 is provided with a locking detent which is not illustrated in greater detail and which can cooperate with a tooth arrangement of the belt roller, which tooth arrangement is secured to the frame and is also not illustrated.

FIG. 1 further shows a force transmission element 40 which comprises a base member 50 and a shearing portion 60. The base member 50 and the shearing portion 60 are preferably constructed in an integral manner and, for example, formed by an integral cast element.

The locking base 30 has a recess 31 which is selected to be so large that the base member 50 can be completely introduced into the recess 31. An introduction of the base member 50 into the recess 31 is carried out in an axial direction, that is to say, in the arrow direction P or in the longitudinal direction of the belt coil 20.

A spring 70 whose resilient force seeks to move the base member 50 in the direction of the recess 31 of the locking base 30 cooperates with the base member 50. The spring 70 may, for example, be a pressure spring which is retained in a recess in the belt coil 20 and which applies a pressure force to the base member 50 in the direction of the recess 31. Alternatively, the spring 70 may also be a tension spring which is retained inside the recess 31 and which applies a pulling force to the base member 50, by means of which force the base member 50 is pulled in the direction of the recess 31.

The shape of the recess 31 in the locking base 30 is selected in such a manner that complete introduction of the base member 50 into the recess 31 by the shearing portion 60 of the force transmission element 40 is blocked and the base member 50 can protrude only partially into the recess 31. That is to say, the cross-section surface-area of the recess 31 is therefore smaller than the cross-section surface-area of the force transmission element 40 in a plane perpendicular relative to the longitudinal coil direction of the belt coil 20 or in a plane perpendicular relative to the arrow direction P in FIG. 1. As a result of the shaping of the recess 31, it is thus impossible to completely introduce the base member 50 of the force transmission element 40 into the recess 31 of the locking base 30 as long as the shearing portion 60 is connected to the base member 50.

As a result of the resilient force of the spring 70, which force seeks to move the base member 50 in the direction of the recess 31 of the locking base 30, the shearing portion 60 moves into a position on the inner side 32 of the locking base 30. The support face of the shearing portion 60, which face is positioned on the inner side 32 of the locking base 30, is designated 61 in FIG. 1.

Figure 2:
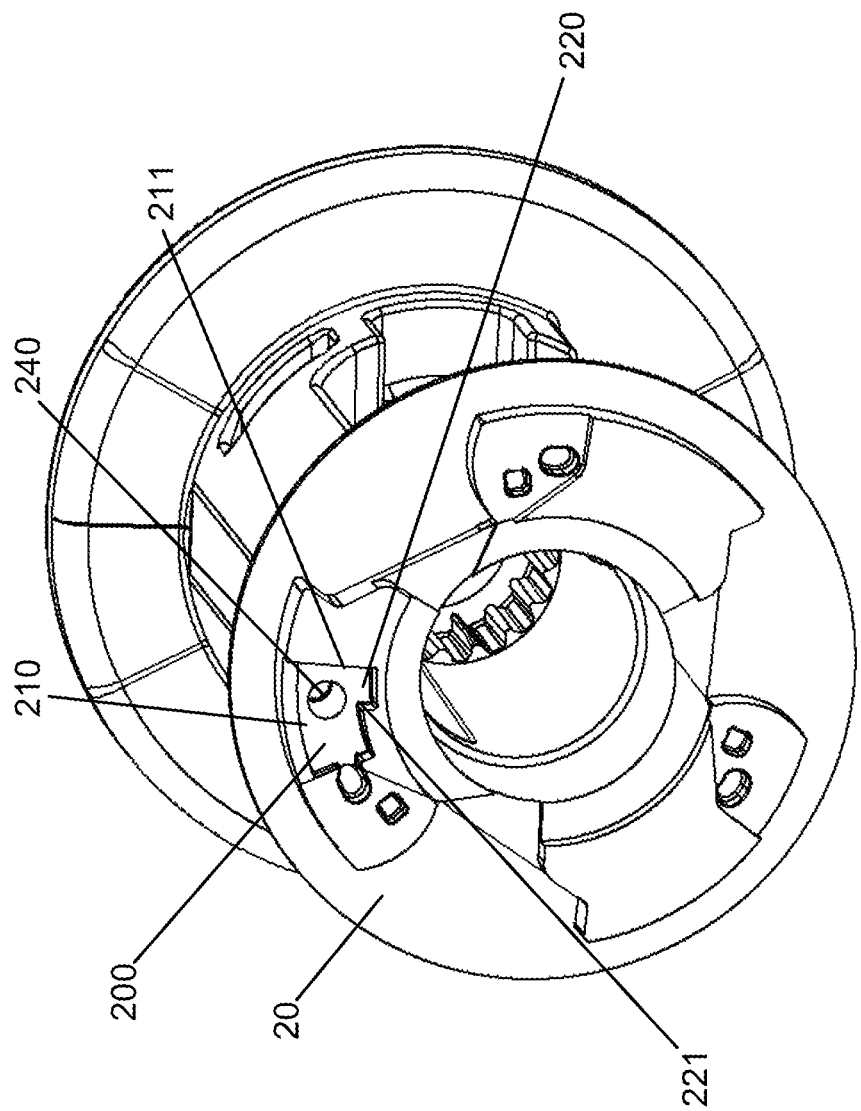
FIG. 2 is a more detailed three-dimensional view of a belt coil of the belt roller.

FIG. 2 shows the belt coil 20 of the belt roller 10 according to FIG. 1 in greater detail. It can be seen that the belt coil 20 is also supplied with a recess; this recess is designated 200. The recess 200 has a first receiving portion 210 and a second receiving portion 220.

The first receiving portion 210 serves to receive a portion of the base member 50 of the force transmission element 40 (cf. FIG. 1). It can be seen with reference to the shape of the first receiving portion 210 that it is selected to be larger than the base member 50; the base member 50 can thereby have a degree of play within the first receiving portion 210. As soon as the shearing portion 60 has been sheared off from the base member 50, the base member 50 can consequently move at least slightly within the first receiving portion 210 so that the spring 70 which is shown in FIG. 1 can move the base member 50 from the first receiving portion 210 in the direction of the recess 31 of the locking base 30 and can preferably move completely into the recess 31 (cf. FIG. 1).

In the initial state, that is to say, before the shearing portion 60 is sheared off, a force transmission face 54 (cf. FIG. 3) of the base member 50 or the force transmission element 40 is preferably opposite an associated force transmission face 211 of the first receiving portion 210 or is in abutment therewith so that the base member 50 can ensure a force transmission together with the force transmission face 211 between the belt coil 20 and locking base 30 in a belt unwinding direction.

The second receiving portion 220 of the recess 200 in the belt coil 20 serves to receive the shearing portion 60. The size of the second receiving portion 220 may correspond to the size of the shearing portion 60 or may also be larger than it.

FIG. 2 further shows a shearing face 221 which belongs to the second receiving portion 220 and—in the initial state, that is to say, before the shearing portion 60 is sheared off—is preferably laterally in abutment with a stop face 62 (cf. FIG. 3) of the shearing portion 60. The object of the shearing face 221 is to act on the stop face 62 of the shearing portion 60 and to shear off the shearing portion 60 from the base member 50 as soon as a tightening drive (which is not illustrated in the Figures) of the belt roller is switched on and the belt coil is rotated in the belt winding direction in order to tighten the safety belt.

The position of the shearing face 221 and the position of the force transmission face 211 of the first receiving portion 210 are preferably selected in such a manner that the force transmission element 40 is guided in the recess 200 on the whole in a play-free manner or at least with little play.

FIG. 2 further shows a recess 240 which is arranged inside the recess 200 and which may be suitable, for example, for receiving a pressure spring. Such a spring which is located in the recess 240 may, for example, serve to press the base member 50 out of the first receiving portion 210 and into the recess 31 of the locking base 30 (cf. FIG. 1) as soon as the shearing face 221 has sheared off the shearing portion 60 of the force transmission element 40.

Figure 3:
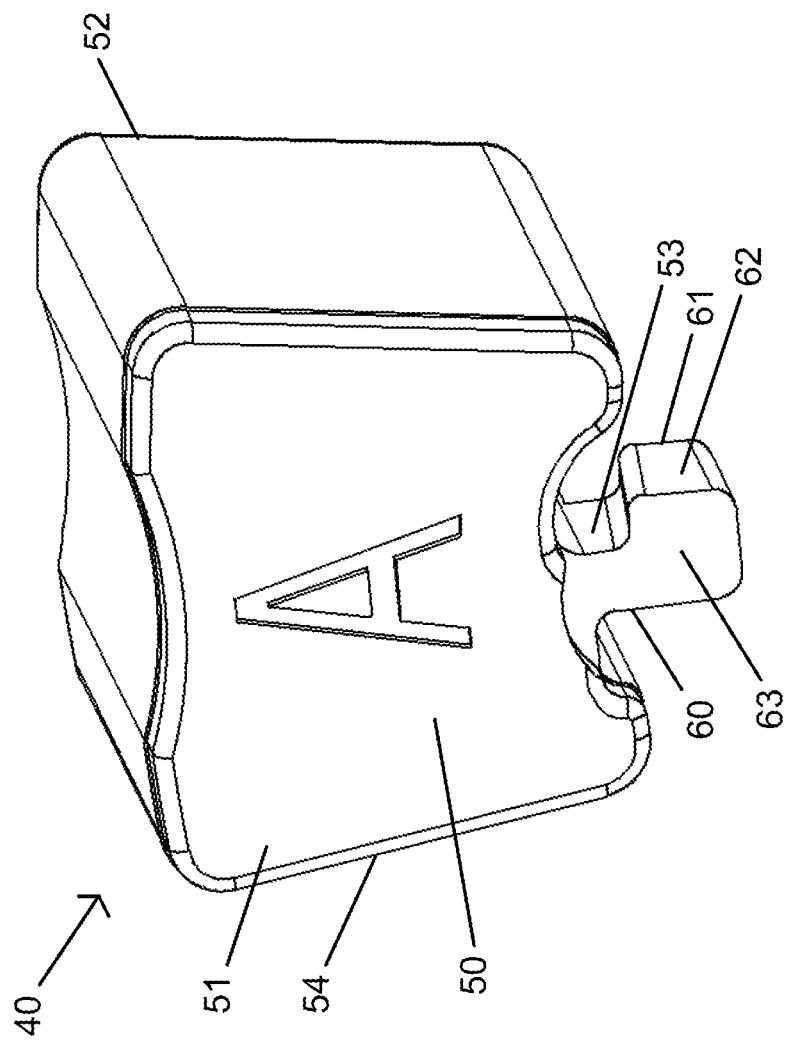
FIG. 3 shows a force transmission element of the belt roller according to FIG. 1 in greater detail.

FIG. 3 shows the force transmission element 40 according to FIG. 1 in greater detail. It is possible to see the base member 50, which has a side face 51 which is at the front in FIG. 3 and a side face 52 which is at the rear in FIG. 3. The two side faces 51 and 52 are preferably arranged in a parallel manner. The side face 51 is additionally indicated in greater detail in FIG. 3 with the reference numeral "A".

In order to assemble the force transmission element 40 in the belt coil 20 and the locking base 30, the side face 51 which is designated "A" is preferably introduced into the recess 200 shown in FIG. 2. The side face 52 of the base member 50 then protrudes into the recess 31 of the locking base 30 according to FIG. 1.

FIG. 3 further also shows the shearing portion 60 in greater detail. It is possible to see a stop face 62 which, after assembly of the force transmission element 40, is positioned in the recess 200 according to FIG. 2 on the shearing face 221 of the second receiving portion 220. As soon as a tightening drive of the belt roller moves the belt coil in order to tighten the belt, the shearing face 221 will press according to FIG. 2 on the stop face 62 and shear the shearing portion 60 off from the base member 50 owing to the mass inertia of the locking base 30 in a manner dependent on inertia.

FIG. 3 further shows a front face 63 of the shearing portion 60 which, after the force transmission element 40 has been introduced into the recess 200, faces the belt coil 20. The front face 63 is preferably parallel with the support face 61 with which the shearing portion 60 rests on the inner side 31 of the locking base 30 (cf. FIG. 1).

In order to ensure that the shearing portion 60 is readily sheared off from the base member 50 when the tightening drive of the belt roller is started, the connection portion 53 is preferably constructed in a tapered manner between the shearing portion 60 and the base member 50 and has a smaller cross-section than the adjacent base member 50 and the adjacent shearing portion 60.

Figure 4:
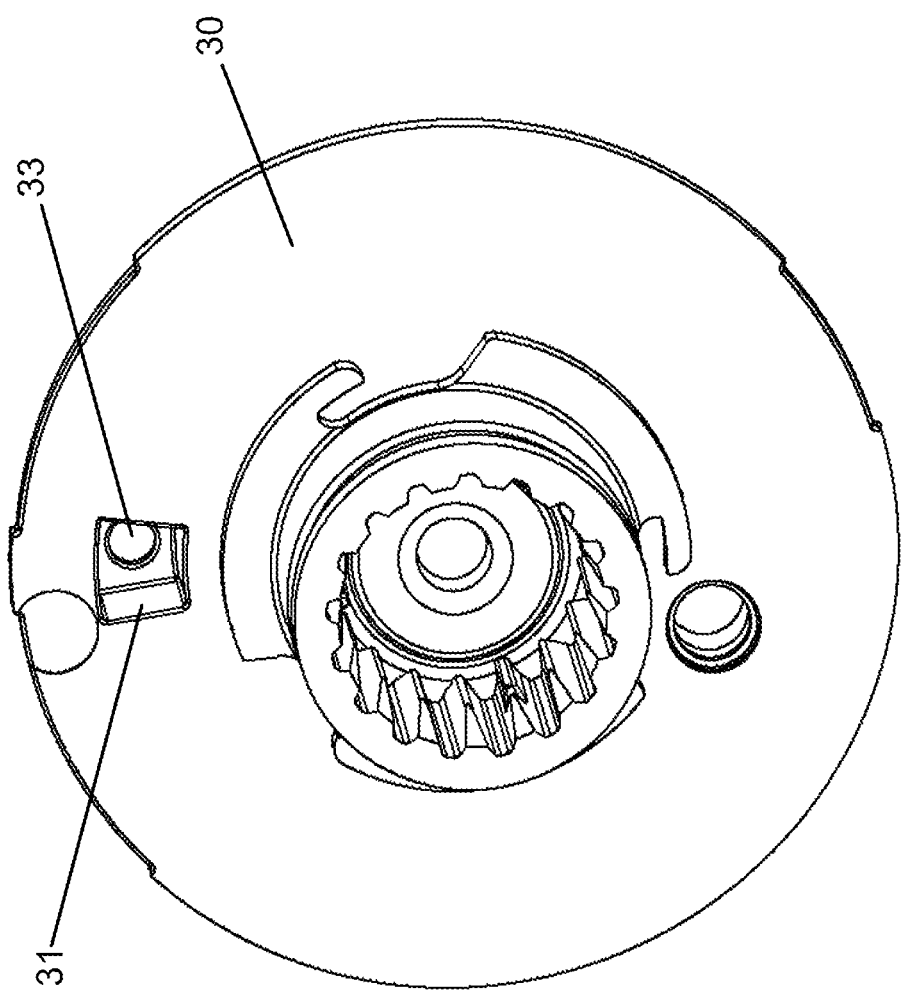
FIG. 4 shows a locking base of the belt roller according to FIG. 1 in greater detail.

FIG. 4 shows the locking base 30 of the belt roller 10 according to FIG. 1 in greater detail. It is possible to see the recess 31, whose shape and size is adapted to the shape and size of the base member 50 (cf. FIG. 3) of the force transmission element 40 in such a manner that the base member 50 is guided in the recess 31 in a play-free manner or at least with little play.

FIG. 4 further shows a recess 33, which makes it possible for a tension spring to be introduced into the recess 31 in such a manner that the tension spring can apply to the base member 50 of the force transmission element 40 a tensile force which seeks to draw the base member 50 into the recess 31. In such an embodiment, as soon as the shearing portion 60 has been sheared off from the base member 50, such a tension spring can draw the base member 50 into the recess 31 so that a force transmission between the belt coil 20 and the locking base 30 is switched off.

Figure 5:
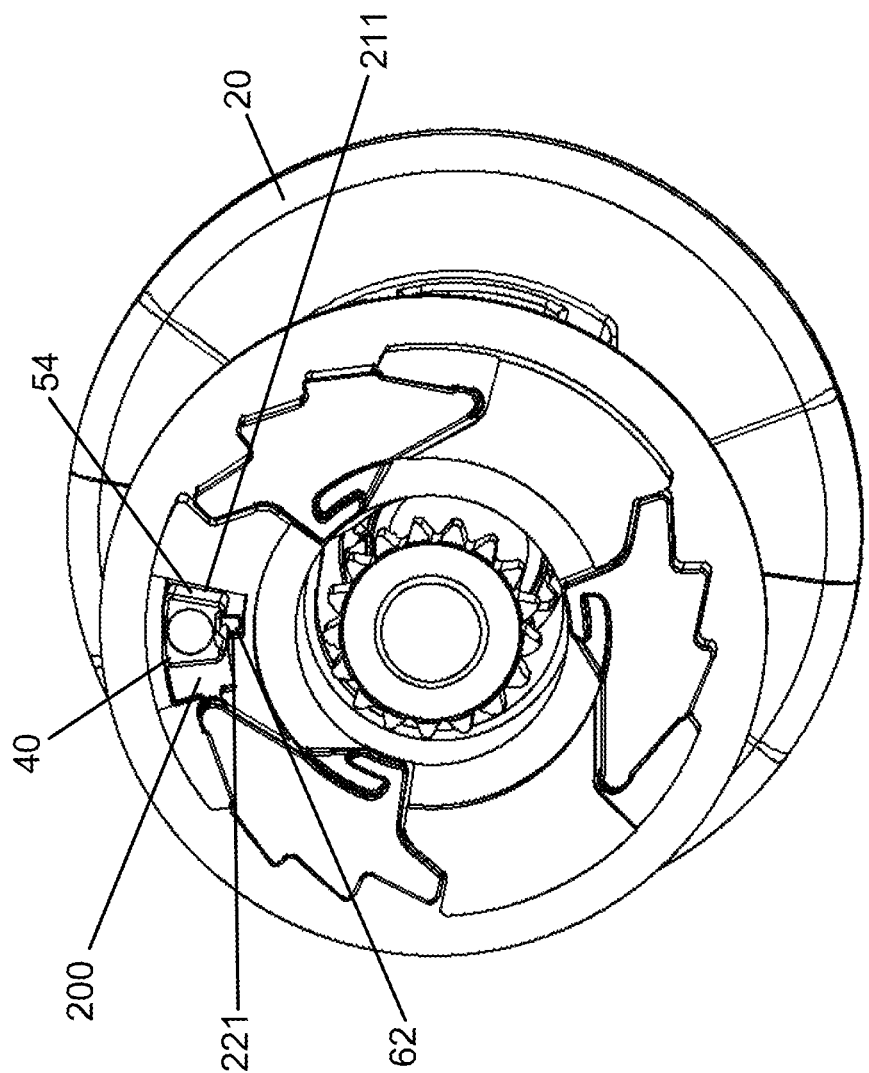
FIG. 5 shows the force transmission element according to FIG. 3 after it has been inserted in a recess of the belt coil according to FIG. 2.

FIG. 5 shows the belt coil 20 again in another illustration, after the force transmission element 40 has been introduced into the recess 200. It can be seen that the stop face 62 is opposite the shearing face 221 so that, when the tightening drive is operated, the shearing face 221 can act on the stop face 62 and can shear off the shearing portion 60 from the base member 50.

FIG. 5 further shows the force transmission face 54 of the base member 50 or the force transmission element 40 which is opposite the associated force transmission face 211 of the first receiving portion 210 (cf. FIG. 2) and ensures a force transmission together with the force transmission face 211 between the belt coil 20 and locking base 30 in the belt unwinding direction.

The belt roller 10 according to FIGS. 1 to 5 can be operated as follows:

1. Operation in the Belt Unwinding Direction:

If a force or a torque is applied to the belt coil 20 in the belt unwinding direction, the force transmission face 211 of the belt coil 20 will act on the force transmission face 54 of the base member 50 of the force transmission element 40 and will seek to move the force transmission face 54 in the belt unwinding direction. Since the base member 50 is guided both in the first receiving portion 210 of the recess 200 and in the recess 31 of the locking base 30, a rotation of the belt coil 20 is possible only as long as the locking base 30 is also moved. If the locking base 30 is blocked, for example, in the event of an abrupt belt strap extraction, a rotation of the belt coil 20 in the belt unwinding direction is prevented by the stable base member 50 of the force transmission element 40. A relative rotation between the belt coil 20 and the locking base 30 can be carried out only after the base member 50 itself has been sheared off. The base member 50 may, for example, have such dimensions that such a shearing action occurs at a force level of, for example, 3000 Newton.

2. Operation in the Belt Winding Direction:

During normal operation—that is to say, before an accident by means of which the tightening drive of the belt roller 10 is initiated—there is produced a force transmission between the belt coil 20 and the locking base 30 by means of the shearing portion 60 of the force transmission element 40. Only when the force acting on the shearing portion 60 is too large, for example, at the time at which the tightening drive of the belt roller 10 is operated as a result of the mass inertia of the locking base 30, does the shearing portion 60 become sheared off so that the spring 70 shown in FIG. 1 can move the base member 50 out of the recess 200 of the belt coil 20 and can completely or almost completely introduce it into the recess 31 of the locking base 30.

As soon as the base member 50 has left the first receiving portion 210 of the recess 200 of the belt coil 20, the tightening drive can rotate the belt coil 20 in the belt winding direction without the locking base 30 also having to be moved. That is to say, the shearing portion 60 of the force transmission element 40 serves to automatically ensure deactivation of the force transmission element 40 as soon as a tightening drive of the belt roller 10 is activated.

During normal operation or even in the event of slight accidents at low speed, however, the shearing portion 60 will withstand the loads acting on it so that the force transmission element 40 remains intact and the base member 50 remains within the first receiving portion 210 of the recess 200 so that the force transmission element 40 can be active both in the belt unwinding direction and in the belt winding direction.

Only in the event of accidents at a relatively high speed, in which the tightening drive of the belt roller 10 becomes active, is the force transmission element 40 destroyed by the shearing portion 60 being sheared off so that the base member 50 is moved out of the belt coil 20 and into the locking base 30, and a force transmission by the force transmission element 40 is switched off.

Figure 6:
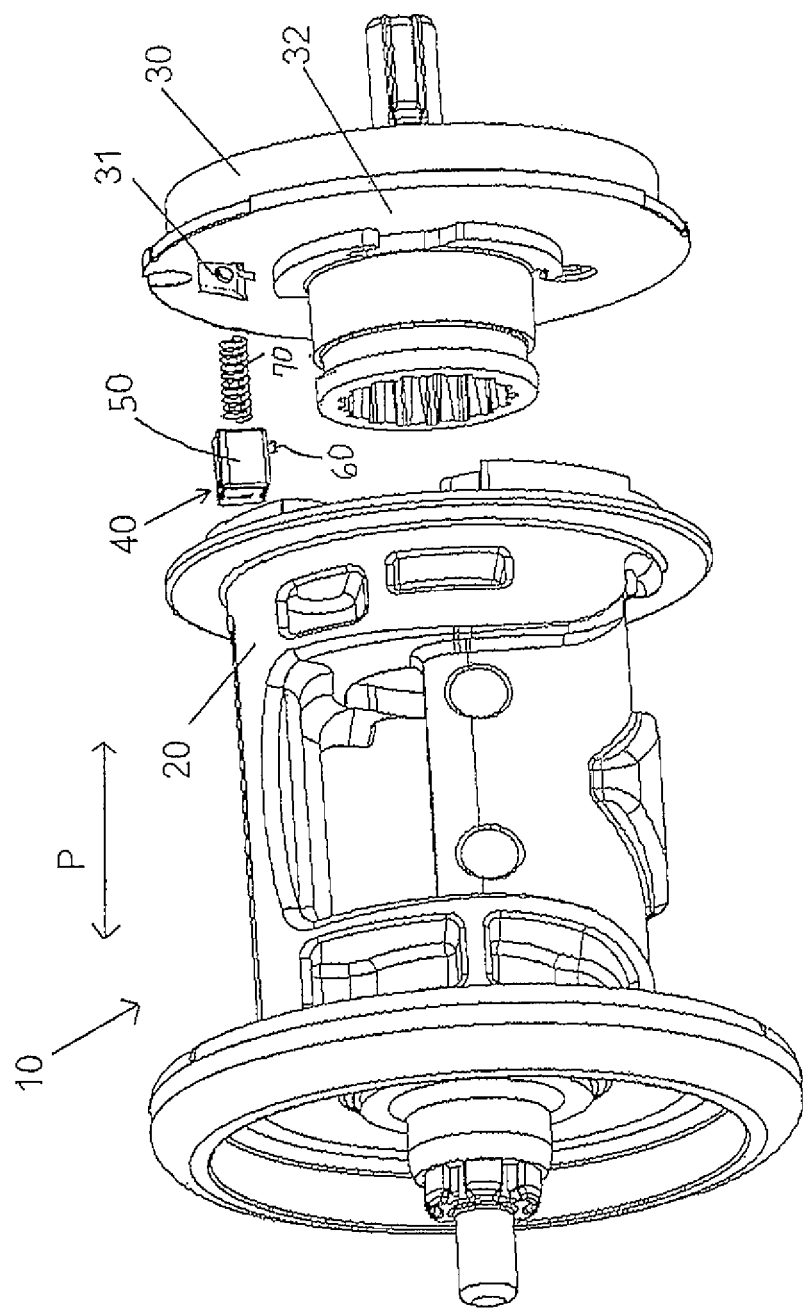
FIG. 6 is a three-dimensional exploded oblique side view of components of a belt roller according to an alternative embodiment of the invention.

In the embodiment according to FIGS. 1 to 5, it has been assumed by way of example that, after the shearing portion 60 has been sheared off from the base member 50 of the force transmission element 40, the base member 50 is moved out of the recess 200 of the belt coil 20 and into the recess 31 of the locking base 30, whereby the force flow is interrupted. Alternatively (as shown in FIG. 6), it is equally possible, after the shearing portion 60 has been sheared off, to move the base member 50 out of the recess 31 of the locking base 30 and into the recess 200 of the belt coil 20 in order to stop a force transmission by the force transmission element 40 between the locking base 30 and the belt coil 20.

LIST OF REFERENCE NUMERALS

10 Belt roller
20 Belt coil
30 Locking base
31 Recess
32 Inner side
33 Recess
40 Force transmission element
50 Base member
51 Front side face
52 Rear side face
53 Connection portion
54 Force transmission face
60 Shearing portion
61 Support face
62 Stop face
63 Front face
70 Spring
200 Recess
210 First receiving portion
211 Force transmission face
220 Second receiving portion
221 Shearing face
240 Recess
A Side face
P Arrow direction

What is claimed is:

1. A belt roller for a safety belt having a rotatable belt coil for winding and unwinding the safety belt, a lockable locking base which is connected to the belt coil and which blocks rotation of the belt coil in the event of an abrupt rotation of the belt coil in the belt unwinding direction, and a force transmission element which couples the belt coil and the locking base in a locking position and is inactive in an unlocking position,
   wherein the force transmission element includes a base member and a shearing portion configured to be sheared off from the force transmission element,
   wherein the base member is retained in an axially displaceable manner in a recess of a first portion, wherein the first portion comprises either the belt coil or the locking base and a second portion comprises the other of the belt coil or the locking base, and
   wherein the base member is configured to be axially displaced from a first position, in which the base member protrudes from the recess and engages the second portion, into a second position, in which the base member is separated from the second portion and is positioned more deeply within the recess than when the base member is in the first position, and
   wherein, in the first position of the base member, the shearing portion blocks an axial displacement of the base member from the first position into the second position and wherein the base member is displaced from the first position into the second position only after the shearing portion is sheared off.

2. The belt roller as claimed in claim 1, wherein the shearing portion has a stop face against which the second portion presses radially when the belt coil is rotated in the belt winding direction and wherein the shearing portion is sheared off by the second portion when the belt coil is rotated in the belt winding direction when the belt winding force acting on the stop face exceeds a predetermined force threshold.

3. The belt roller as claimed in claim 2, wherein the shearing portion has a support face which is positioned in an axial direction at the outer side on the first portion and which, before the shearing portion is sheared off, blocks a displacement of the base member from the first position into the second position.

4. The belt roller as claimed in claim 3, wherein the support face and the stop face are perpendicular.

5. The belt roller as claimed in claim 1, wherein the belt roller is configured to be driven in the belt tightening direction and wherein the shearing portion is configured so that when the belt roller is driven in the belt tightening direction the shearing portion is sheared off and the base member is displaced from the first position into the second position.

6. The belt roller as claimed in claim 1, wherein the belt roller includes a spring having a resilient force that urges the base member to move in the direction of the second position.

7. The belt roller as claimed in claim 1, wherein the second portion has a recess having a first receiving portion and a second receiving portion and, in the first position of the base member, a portion of the base member engages in the first receiving portion of the second portion and the shearing portion engages in the second receiving portion of the second portion.

8. The belt roller as claimed in claim 7, wherein the first receiving portion of the second portion is larger than the portion of the base member located therein so that the base member is moveable within the first receiving portion.

9. The belt roller as claimed in claim 1, wherein the shearing portion has a support face which is positioned in an axial direction at the outer side on the first portion and which, before the shearing portion is sheared off, blocks a displacement of the base member from the first position into the second position.

\* \* \* \* \*